United States Patent
Michnik et al.

(10) Patent No.: US 7,793,389 B1
(45) Date of Patent: Sep. 14, 2010

(54) ADJUSTABLE HANDLING APPARATUS

(76) Inventors: Alisa Michnik, 23 Clemson Rd., Cherry Hill, NJ (US) 08034; Yefim Michnik, 23 Clemson Rd., Cherry Hill, NJ (US) 08034

( * ) Notice: Subject to any disclaimer, the term of this patent is extended or adjusted under 35 U.S.C. 154(b) by 534 days.

(21) Appl. No.: 11/824,902

(22) Filed: Jul. 3, 2007

(51) Int. Cl.
*B25G 3/32* (2006.01)

(52) U.S. Cl. .............................. 16/422; 16/425; 16/430

(58) Field of Classification Search .................. 16/422, 16/445; 294/99.2, 16, 13, 106, 902; 269/6, 269/95, 81; 29/270, 268; 220/759
See application file for complete search history.

(56) References Cited

U.S. PATENT DOCUMENTS

| | | | | |
|---|---|---|---|---|
| 2,207,286 | A * | 7/1940 | Cohen | 269/6 |
| 2,593,054 | A * | 4/1952 | Reagan, Sr. et al. | 131/174 |
| 3,232,657 | A * | 2/1966 | Thompson et al. | 294/31.1 |
| 3,743,234 | A * | 7/1973 | Pietrzak | 249/203 |
| 3,929,363 | A * | 12/1975 | Kahan | 294/1.4 |
| 4,923,234 | A * | 5/1990 | Fairley | 294/99.2 |
| 5,048,882 | A * | 9/1991 | Fielding et al. | 294/33 |
| 5,577,785 | A * | 11/1996 | Traber et al. | 294/19.1 |
| 5,887,751 | A | 3/1999 | Kroscher | |
| 6,260,733 | B1 | 7/2001 | Eimerman | |
| 6,571,505 | B1 * | 6/2003 | Poiencot, Jr. | 43/5 |
| 2006/0162128 | A1 * | 7/2006 | Prip | 16/422 |

\* cited by examiner

*Primary Examiner*—Chuck Y. Mah

(57) ABSTRACT

An adjustable handling apparatus comprising an object to handle and at least one detachable handle. The object comprises at least one attachment part. Each of the handles comprises one handle body or a plurality of connected handle bodies. Each handle body comprises a gripping part and at least one attachment part. Attachment parts comprise a predetermined number of engagement components. Each of handle engagement components is adapted to engage with each of predetermined object engagement components allowing the handle to be oriented about the object differently for maximum comfort. The density of the engagement components limits the number of positions the handle can be oriented about the object. Once the handle engagement components are engaged with the desired object engagement components, the handle is locked to the object automatically. The handle must be unlocked manually in order to be detached from the object.

6 Claims, 21 Drawing Sheets

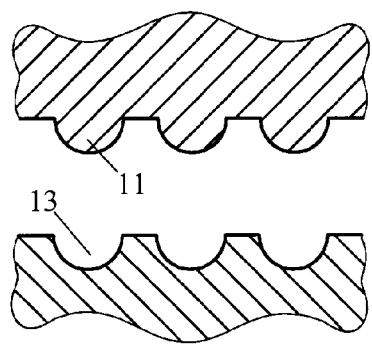
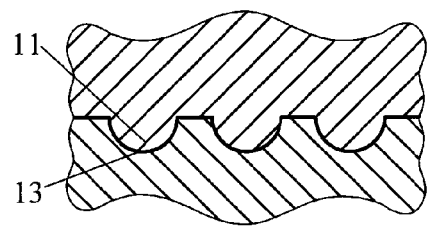
FIG. 3  FIG. 4
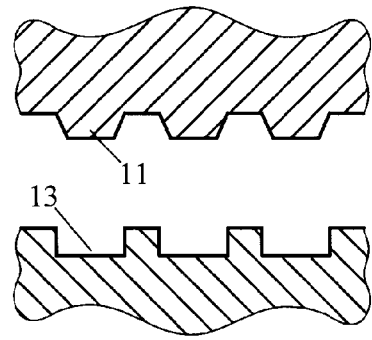
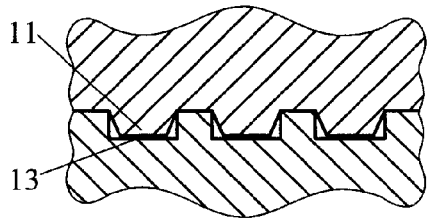
FIG. 5  FIG. 6

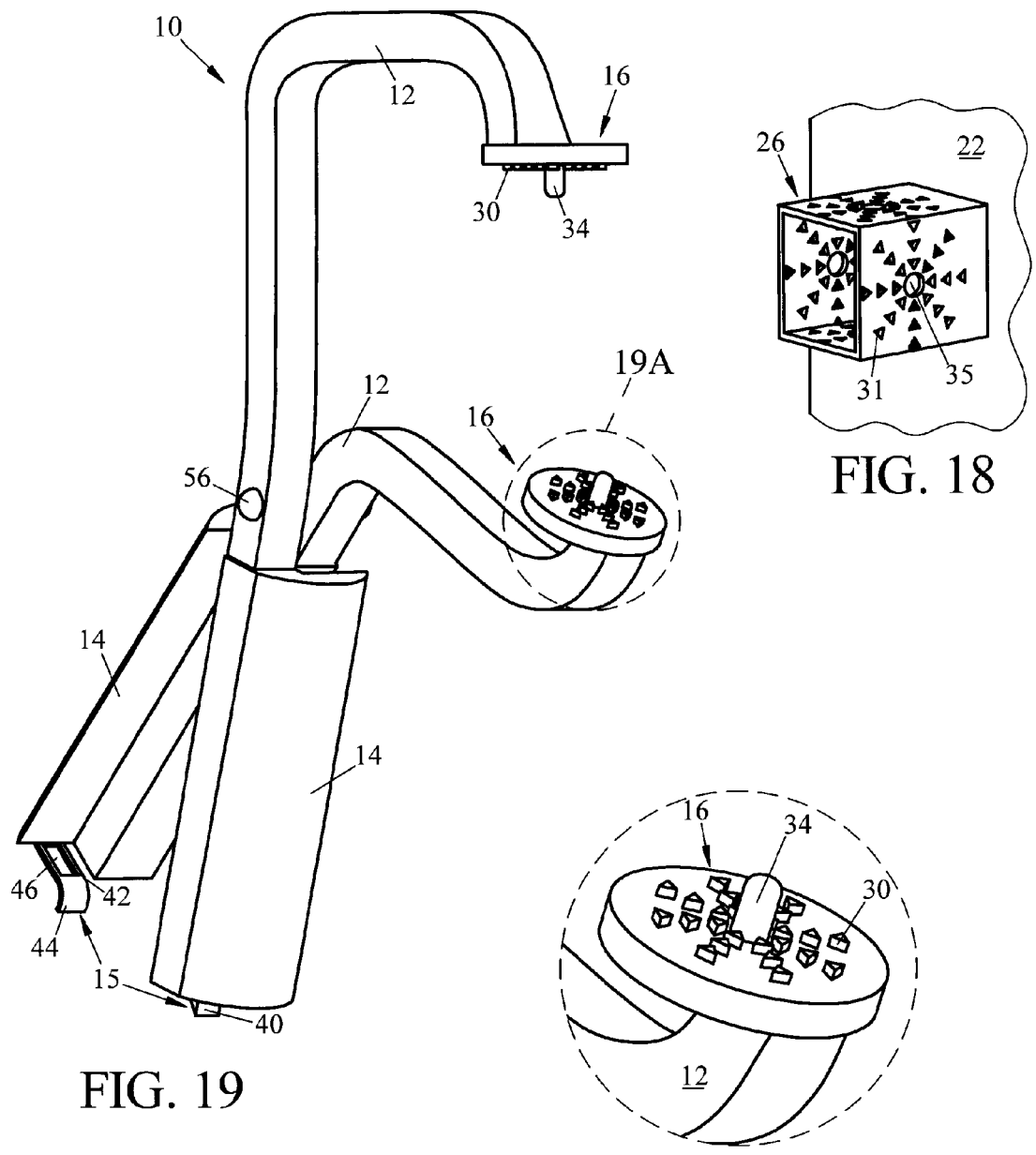

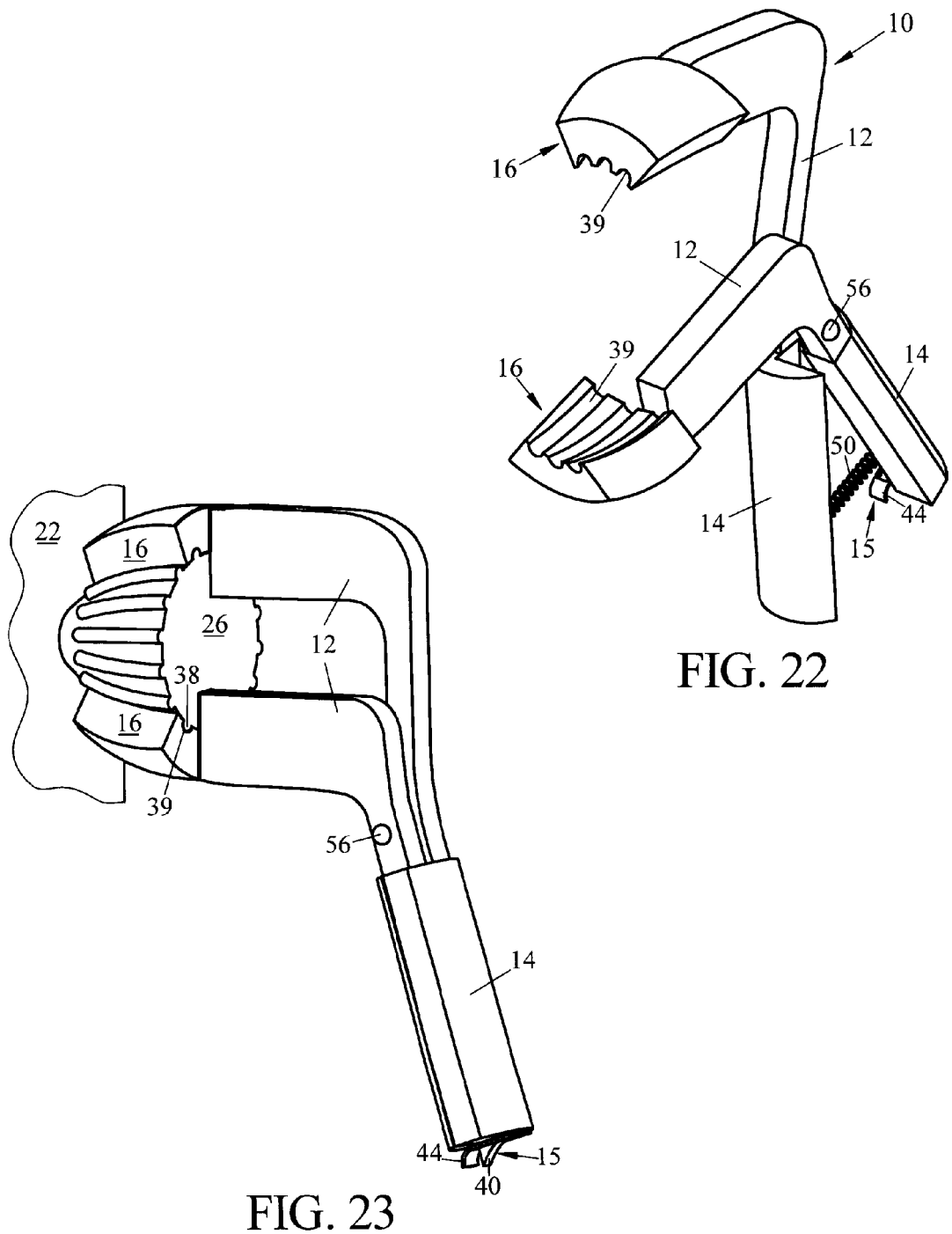

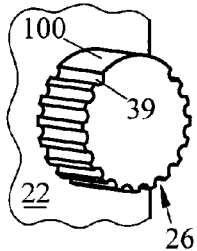
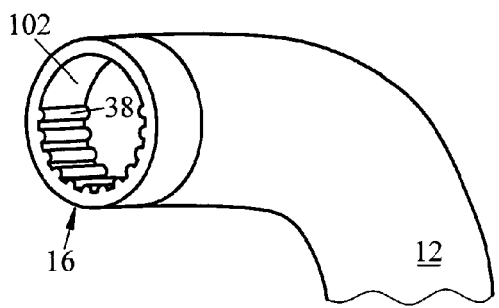
FIG. 24    FIG. 25
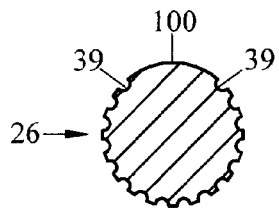
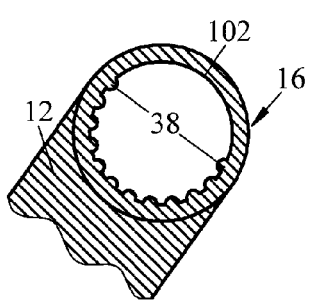
FIG. 26    FIG. 27
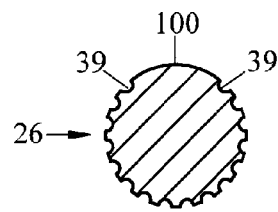
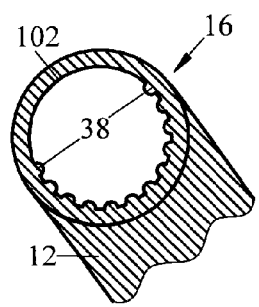
FIG. 28    FIG. 29
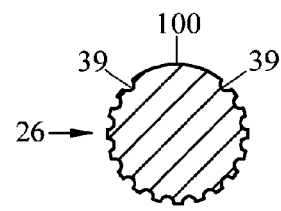
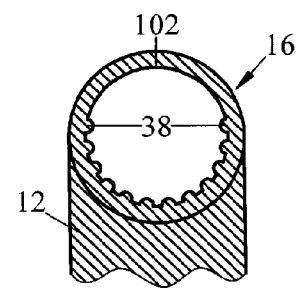
FIG. 30    FIG. 31

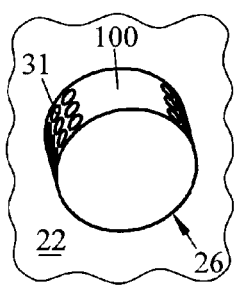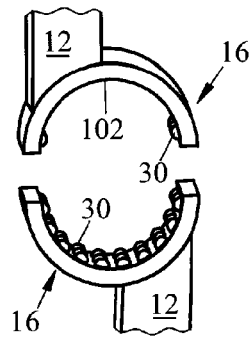
FIG. 32    FIG. 33
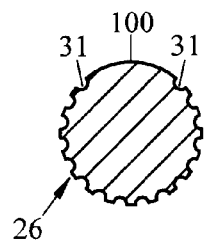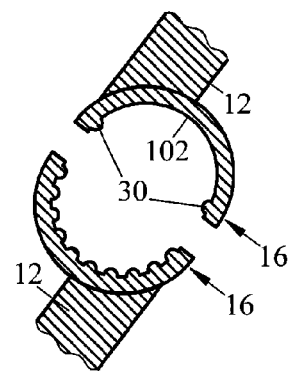
FIG. 34    FIG. 35
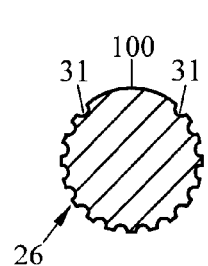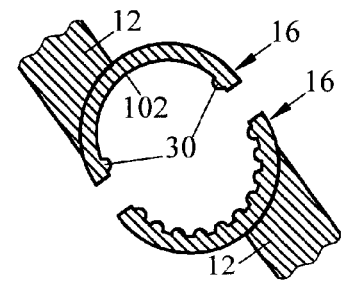
FIG. 36    FIG. 37
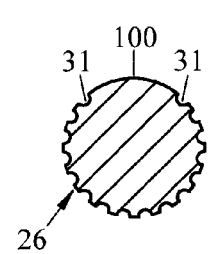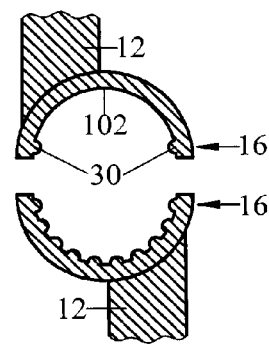
FIG. 38    FIG. 39

ADJUSTABLE HANDLING APPARATUS

BACKGROUND OF THE INVENTION

1. Field of the Invention

This invention relates to a field of cookware or any other field, where specifically, detachable handles for an object to handle can be attached to the object differently depending on a particular task.

2. Background of the Invention

Detachable handles for cookware such as pots and pans add a great deal of convenience by saving space in storage, refrigerator, dishwasher, on the stove top, and in the oven. This is essential when storage and kitchen space is limited.

A detachable cookware handle has been described in U.S. Pat. No. 5,888,751 issued on Mar. 30, 1999 to Kroscher, where a handle portion includes a locking mechanism and a vessel engaging portion.

U.S. Pat. No. 6,260,733 issued on Jul. 17, 2001 to Eimerman discloses a releasable handle for cookware having at least one opening for receiving a side handle of a piece of cookware.

However, these prior art detachable handles are limited in their handling capabilities. More particularly, the handle can be attached to the vessel only in a single position in the Kroscher and the Eimerman devices, making it uncomfortable, for instance, in case of draining. Inability to attach the handles in comfortable positions suited for a particular task of handling the cookware can inflict pain, cause joint damage, and might result in accidents.

Consequently, there is a need for a detachable handle that can be attached differently for maximum comfort. This invention achieves this while overcoming the disadvantages of the prior art devices.

OBJECTS OF THE INVENTION

Accordingly, several objects and advantages of the present invention are:

To provide a convenient device with an ability to attach each handle in a desired position for each task, for instance, removing a pot from the oven or draining.

To provide a device which is easy to use by providing detachable handles that can be attached to an object at the same time with both hands.

To provide a safe device which does not require force when attaching a handle to an object, for instance, reducing the risk of spilling the contents of a pot.

To provide a device which reduces risk of getting burned by encouraging the attachment of handles only for a short period of time when removing, for instance, a hot pot from an oven.

To provide a sufficient device which does not require additional protective means, for instance, cooking mitts, for hot applications.

To provide a cost efficient device which, for instance, allows reusing same handles with multiple pot, pans, etc.

To provide a device which saves space, for instance, in refrigerators, dishwashers, ovens, pantries, or on stovetops.

To provide a device which saves time involved in organizing multiple cookware, for instance, in refrigerators, dishwashers, ovens, pantries, or on stovetops.

To provide a practical device, for instance, with pots and pans being stackable when the handles are removed.

To provide an easy to clean device, for instance, with no hidden spots for food particles to get trapped inside.

To provide a device with security by providing hard to substitute detachable handles where, for instance, heavy or bulky objects cannot be handled easily, if at all, without such specialized handles.

Further objects and advantages of this invention will become apparent from a consideration of the drawings and ensuing description.

SUMMARY OF THE INVENTION

The present invention may be generally described as a handling apparatus comprising an object and at least one detachable handle that can be attached to the object differently for the purpose of handling the object in a most comfortable position.

The object comprises at least one attachment part. Each of the handles comprises one handle body or a plurality of connected handle bodies. Each handle body comprises a gripping part and at least one attachment part. Each of the attachment parts comprises a predetermined number of elastic or fixed shape engagement components. The handle engagement components are adapted to engage with the object engagement components. Fixed shape engagement components can engage with elastic or complementary fixed shape engagement components; and elastic engagement components can engage with elastic or fixed shape engagement components. If at least one of the engaging attachment parts comprises elastic engagement components, it is adapted to engage with any shape and density of fixed shape engagement components of the complementary attachment part during engagement. If both engaging attachment parts comprise elastic engagement components, they are adapted to engage by traction. If engaging attachment parts comprise fixed shape engagement components, the number of desirable engaged positions is finite and limited by the density and shape of the engagement components. If at least one of engaging attachment parts comprises elastic engagement components, the number of desired engaged positions is not limited.

The gripping part is used to attach the handle to the object in an attached position, to handle the object in the attached position, and to remove the handle from the object when the handle is detached from the object. The attached position is achieved when the handle engagement components are engaged with the object engagement components. Each of the handle engagement components is adapted to engage with any one of the predetermined object engagement components providing a plurality of attached positions and resulting in an ability to orient the handle differently about the object.

Once in the desired attached position, the handle is locked to the object automatically securing the attached position without further user assistance and regardless of orientation of the adjustable handling apparatus. The lock must be disengaged manually for removing the handle from the object. After the lock has been disengaged, the handle can be detached manually using gripping parts (one gripping part if the handle comprises only one gripping part) or automatically using, for instance, a compression spring between gripping parts for detaching handle engagement components from object engagement components which, in turn, allows the user to remove the handle from the object.

There are two sample types of fixed shape engagement components described herein: polka dot engagement components and continuous engagement components. Polka dot engagement components are arranged in a polka dot pattern. Continuous engagement components form a circular shape around a predetermined axis resembling straight lines oriented along the axis or lines curved in a predetermined way along the axis. The handle with a predetermined type of the engagement components is intended to be attached to an object attachment part with the same type of the engagement components.

Polka dot engagement components can be spherical engagement components when forming a sphere or a spherical segment where each of the engagement components being equidistant from a predetermined center or can be non-spherical engagement components forming shapes which are not spheres or spherical segments. Spherical engagement components provide a choice of different handle orientation positions within a virtually unlimited number of two-dimensional planes of unobstructed three-dimensional space. Non-spherical engagement components provide a choice of different handle orientation positions within a predetermined number of two-dimensional planes of unobstructed three-dimensional space. Continuous engagement components provide a choice of different handle orientation positions within unobstructed areas of one two-dimensional plane perpendicular to the predetermined axis. The number of orientation positions is limited by the density of the engagement components, the greater the density the greater the number of positions.

The features briefly described in this summary as well as other features and advantages of this invention will become apparent to those skilled in the art upon review of the following drawings, the detailed description, and the appended claims.

BRIEF DESCRIPTION OF THE DRAWINGS

FIG. 3 shows a partial sectional view of a sample set of disengaged engagement components;

FIG. 4 shows a partial sectional view of the set of engaged engagement components depicted in FIG. 3;

FIG. 5 shows a partial sectional view of another sample set of disengaged engagement components;

FIG. 6 shows a partial sectional view of the set of engaged engagement components depicted in FIG. 5;

FIG. 18 shows a partial perspective view of a pot with a pot attachment part comprising non-spherical polka dot receiving engagement components;

FIG. 19 shows a perspective view of a detachable handle comprising two handle bodies with attachment parts comprising non-spherical polka dot protruding engagement components adapted to engage with the non-spherical polka dot receiving engagement components of the pot attachment part shown in FIG. 18;

FIG. 19A shows an enlarged view of a part of the handle with the attachment part illustrated in FIG. 19;

FIG. 22 shows a perspective view of a detachable handle comprising automatically detachable two handle bodies with attachment parts comprising continuous receiving engagement components resembling curved lines adapted to engage with the pot continuous protruding engagement components shown in FIG. 21;

FIG. 23 shows a partial perspective view of an attached position of the handle and the pot shown in FIGS. 21 and 22;

FIG. 24 shows a partial perspective view of a pot with a pot attachment part comprising continuous receiving engagement components and a blocking part;

FIG. 25 shows a partial perspective view of a handle comprising one handle body with a handle attachment part comprising a blocking part and continuous protruding engagement components adapted to engage with the pot continuous receiving engagement components shown in FIG. 24 where the blocking parts prevent the handle from being attached to the pot in undesirable positions;

FIGS. 26 and 27 show respectively partial sectional views of the pot and handle attachment parts shown in FIGS. 24 and 25 where the handle attachment part is shown in the most left position it can be attached to the pot attachment part shown in FIG. 26;

FIGS. 28 and 29 show respectively partial sectional views of the pot and handle attachment parts shown in FIGS. 24 and 25 where the handle attachment part is shown in the most right position it can be attached to the pot attachment part shown in FIG. 28;

FIGS. 30 and 31 show respectively partial sectional views of the pot and handle attachment parts shown in FIGS. 24 and 25 where the handle attachment part is oriented in such way that it can be attached to the pot attachment part shown in FIG. 30 between the most left and the most right positions;

FIG. 32 shows partial perspective view of a pot with a pot attachment part comprising polka dot receiving engagement components and a blocking part;

FIG. 33 shows a partial perspective view of a handle comprising two handle bodies with one handle attachment part comprising a blocking part and both of the handle attachment parts comprising polka dot protruding engagement components adapted to engage with the pot polka dot receiving engagement components shown in FIG. 32 where the blocking parts prevent the handle from being attached to the pot in undesirable positions;

FIGS. 34 and 35 show respectively partial sectional views of the pot and handle attachment parts shown in FIGS. 32 and 33 where the orientation of the handle attachment parts will result in the most left position the handle can be attached to the pot attachment part shown in FIG. 34;

FIGS. 36 and 37 show respectively partial sectional views of the pot and handle attachment parts shown in FIGS. 32 and 33 where the orientation of the handle attachment parts will result in the most right position the handle can be attached to the pot attachment part shown in FIG. 36;

FIGS. 38 and 39 show respectively partial sectional views of the pot and handle attachment parts shown in FIGS. 32 and 33 where the handle attachment parts are oriented in such way that the handle can be attached to the pot attachment part shown in FIG. 38 between the most left and the most right positions;

DETAILED DESCRIPTION OF THE INVENTION

Figure 1:
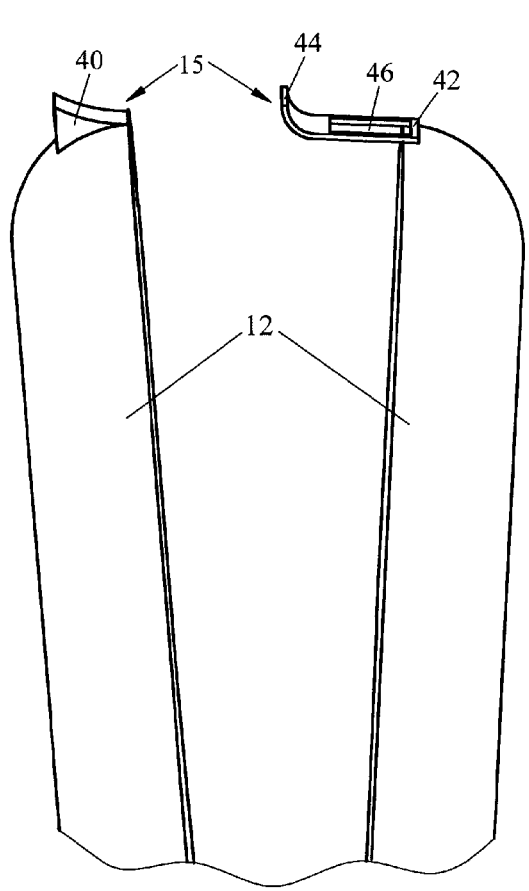
FIG. 1 shows a partial perspective view of a sample handle automatic locking mechanism in an unlocked position for cooking apparatuses with manual detachment of handles comprising two handle bodies.

For demonstrative purposes, a plurality of cooking apparatuses will be described herein. Each of the cooking apparatuses comprises a pot as the object to handle and at least one detachable handle adapted to be attached to the pot in any of predetermined positions. Referring to the drawings, the pot is described herein as pot 20, the pot wall is described herein as a pot wall 22, each of the pot attachment parts is described herein as a pot attachment part 26, each of the detachable handles is described herein as a handle 10, the handle body is described herein as a handle body 12, the handle gripping part is described herein as a handle gripping part 14, and each of the handle attachment parts is described herein as a handle attachment part 16.

Figure 1A:
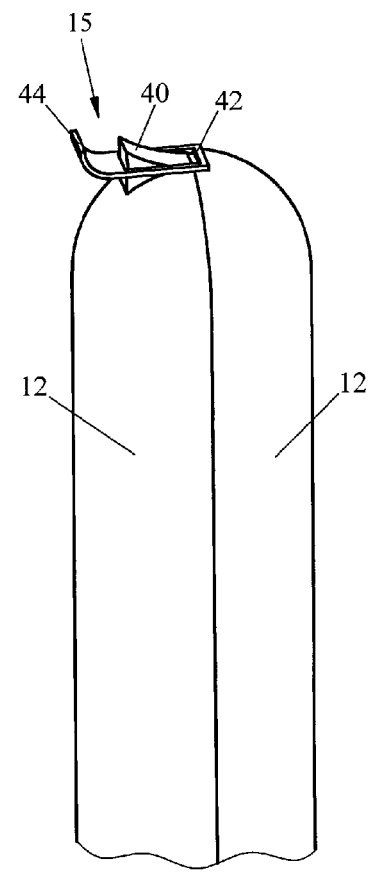
FIG. 1A shows a partial perspective view of a sample handle automatic locking mechanism in a locked position for cooking apparatuses with manual detachment of handles comprising two handle bodies.

For exemplary purposes, FIGS. 1 and 1A illustrate a sample handle automatic locking mechanism 15 for cooking apparatuses with handles comprising two handle bodies. One handle body 12 includes a protruded part 40. The other handle body 12 includes a receiving part which is a spring bar 42 attached by one end to the handle body 12. The spring bar 42 includes a flange 44 and an opening 46 adapted to receive the protruded part 40. Squeezing the handle bodies 12 will cause the protruded part 40 to slide under the flange 44 bending the spring bar 42. When the handle bodies 12 are brought together, the protruding part 40 gets inserted into the opening 46 at which point the spring bar 42 unbends securing the protruding part 40 in place and, therefore, locking handle bodies 12 together. Disengagement of the lock is achieved manually by bending the flange 44 away from the protruded part 40 until the protruded part 40 slides out of the spring bar opening 46 at which point the handle bodies 12 can be brought apart manually.

Figure 2:
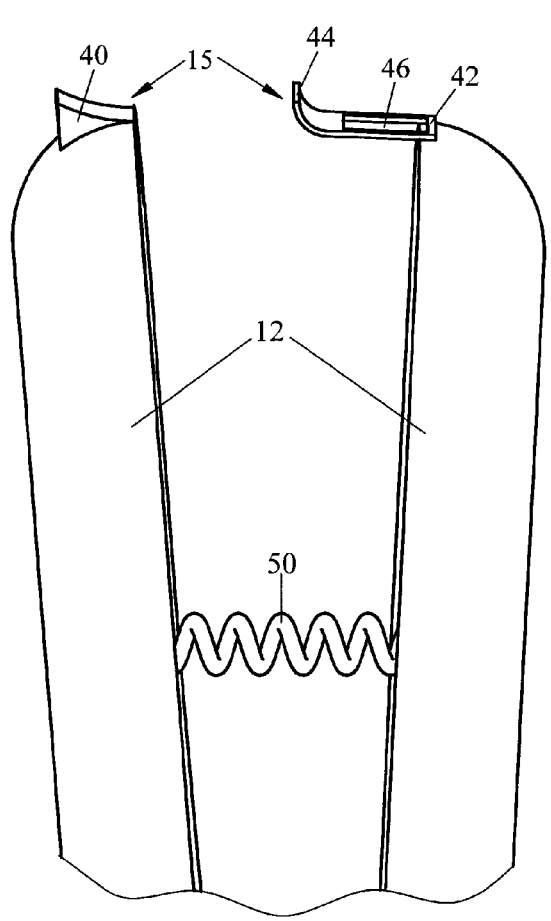
FIG. 2 shows a partial perspective view of a sample handle automatic locking mechanism in an unlocked position for cooking apparatuses with automatic detachment of handles comprising two handle bodies.
Figure 2A:
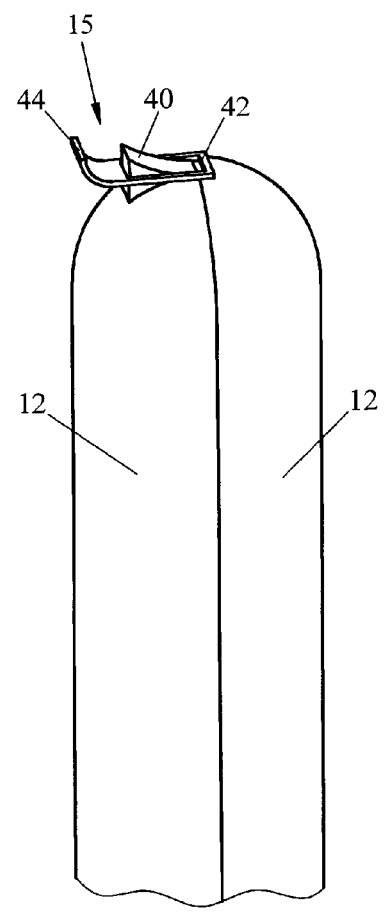
FIG. 2A shows a partial perspective view of a sample handle automatic locking mechanism in a locked position for cooking apparatuses with automatic detachment of handles comprising two handle bodies.

FIGS. 2 and 2A depict the handle automatic locking mechanism 15 described in FIGS. 1 and 1A with addition of a compression spring 50 for automatic detachment of the handle. The compression spring 50 is located between the handle bodies 12 keeping them apart when the handle bodies 12 are not locked to each other. Squeezing the handle bodies 12 will cause the spring 50 to compress and remain fixated in the compressed position when the handle bodies 12 are locked together. Once the lock is disengaged, the spring 50 deflecting force will automatically bring the handle bodies 12 apart.

FIGS. 3-6 depict partial sectional views of two sample sets of fixed shape engagement components comprising protruding engagement components 11 and receiving engagement components 13 adapted to engage with each other. These samples demonstrate that a wide variety of engagement components can be used. FIGS. 3 and 5 depict the engagement components 11 and 13 being disengaged from each other and FIGS. 4 and 6 depict attached positions where the engagement components 11 and 13 are engaged with each other. These sectional views can represent polka dot engagement components (see FIGS. 7-20A and 32-39 for three dimensional views) and continuous engagement components (see FIGS. 21-31 for three dimensional views). For demonstrative purposes, the engagement components are described herein as polka dot protruding engagement components 30, polka dot receiving engagement components 31, continuous protruding engagement components 38, and continuous receiving engagement components 39.

Figure 52:
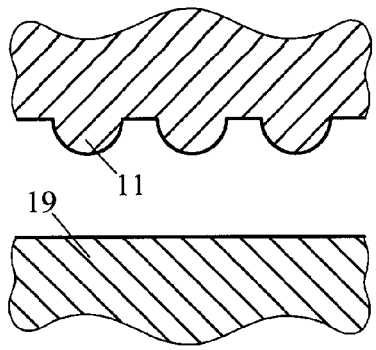
FIG. 52 shows a partial sectional view of a sample set comprising an elastic engagement component not engaged with fixed shape engagement components.
Figure 53:
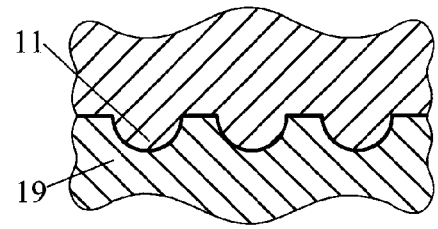
FIG. 53 shows a partial sectional view of the engagement components depicted in FIG. 52 being engaged.
Figure 54:
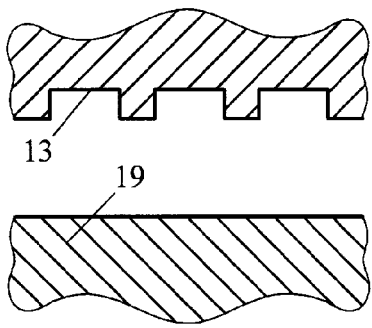
FIG. 54 shows a partial sectional view of another sample set comprising an elastic engagement component not engaged with fixed shape engagement components.
Figure 55:
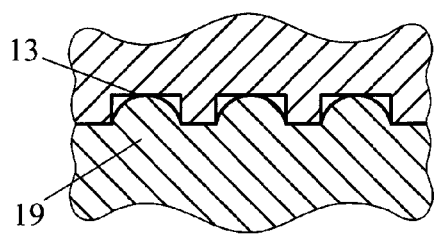
FIG. 55 shows a partial sectional view of the engagement components depicted in FIG. 54 being engaged.

FIGS. 52-55 depict partial sectional views of two sample sets of elastic engagement components 19 adapted to engage with fixed shape engagement components. FIG. 52 depicts the protruding engagement components 11 being disengaged from the elastic engagement component 19 and FIG. 53 depicts the attached position where the engagement components 11 and 19 are engaged with each other. FIG. 54 depicts the receiving engagement components 13 being disengaged from the elastic engagement component 19 and FIG. 55 depicts the attached position where the engagement components 13 and 19 are engaged with each other.

Figure 56:
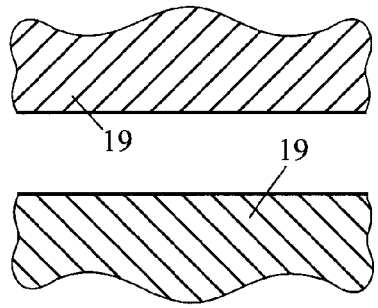
FIG. 56 shows a partial sectional view of a sample set comprising elastic engagement components not engaged with each other.
Figure 57:
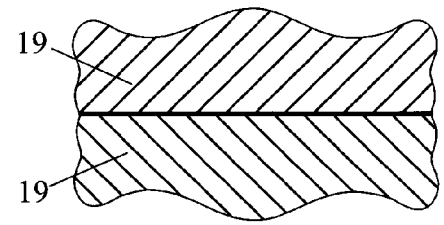
FIG. 57 shows a partial sectional view of the engagement components depicted in FIG. 56 being engaged.

FIGS. 56 and 57 depict partial sectional views of a set of elastic engagement components 19 adapted to engage with each other. FIG. 56 depicts the elastic engagement component 19 being disengaged from the elastic engagement component 19 and FIG. 57 depicts the attached position where the elastic engagement components 19 are engaged with each other.

Figure 7:
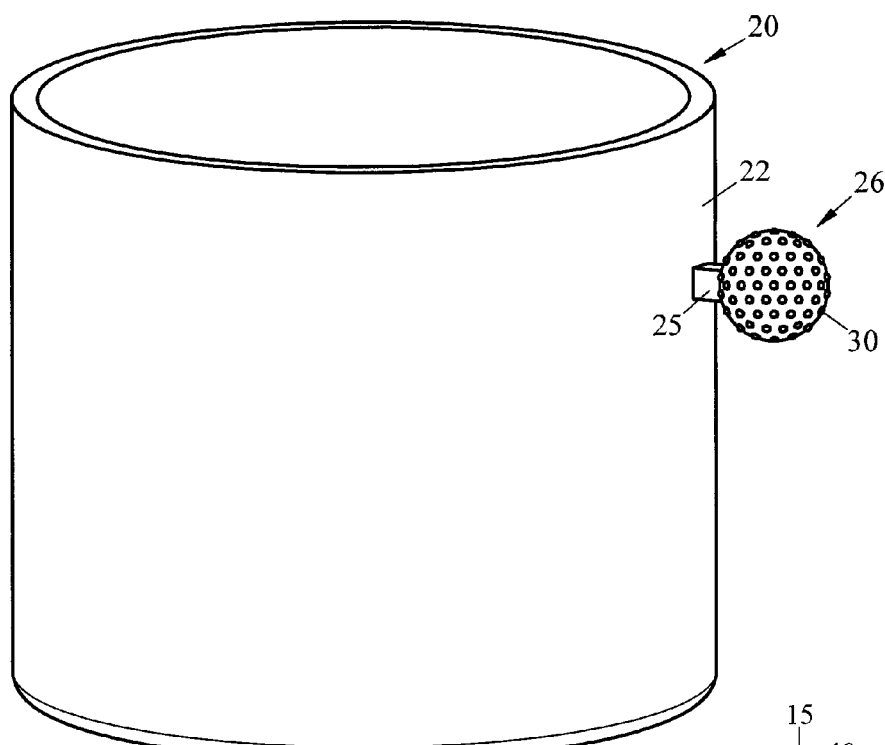
FIG. 7 shows a perspective view of a pot with a pot attachment part comprising spherical polka dot protruding engagement components forming a sphere.
Figure 8:
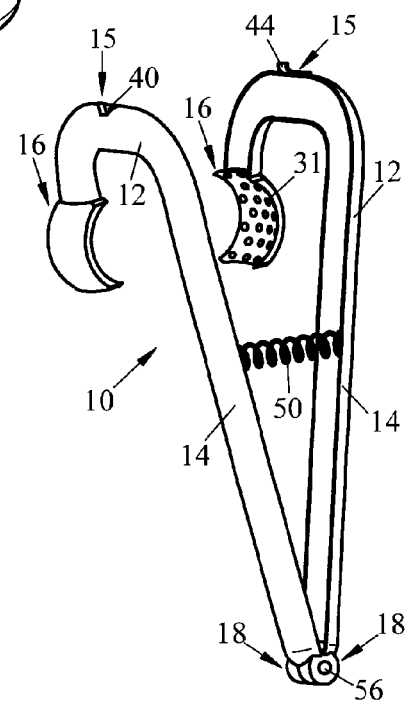
FIG. 8 shows a perspective view of a detachable handle comprising two handle bodies with attachment parts comprising spherical polka dot receiving engagement components adapted to engage with the spherical polka dot protruding engagement components of the pot attachment part shown in FIG. 7.
Figure 9:
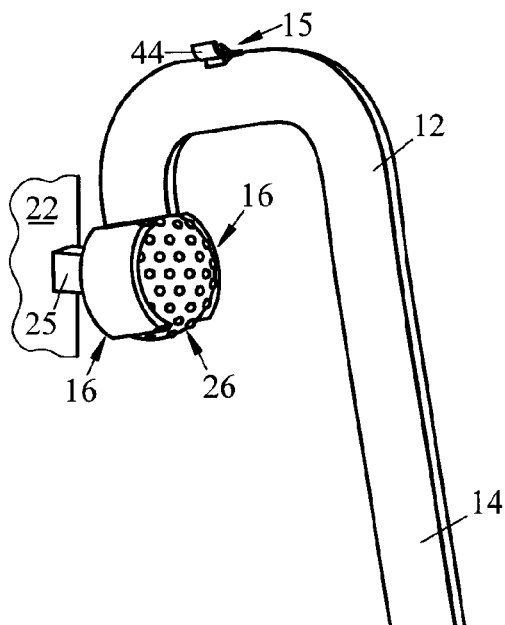
FIG. 9 shows a partial perspective view of an attached position of the handle and the pot shown in FIGS. 7 and 8.
Figure 11:
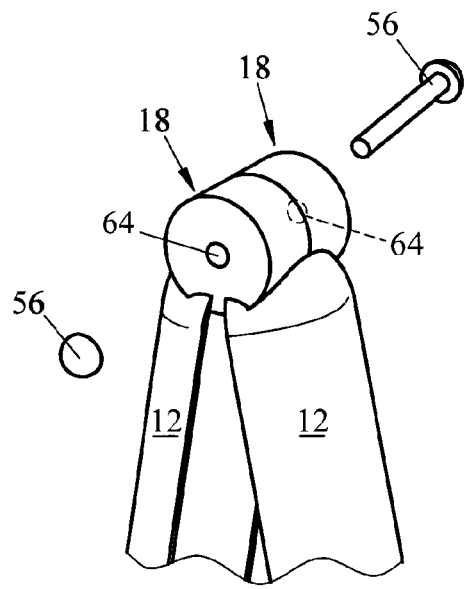
FIG. 11 shows a partial exploded perspective view of connected handle bodies of the handle shown in FIGS. 8-10.
Figure 10:
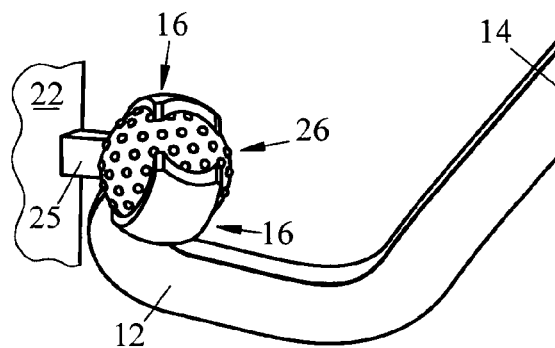
FIG. 10 shows a partial perspective view of another attached position of the handle and the pot shown in FIGS. 7 and 8.

FIGS. 7-11 depict a sample cooking apparatus demonstrating polka dot spherical engagement components used for a pot with handles comprising two handle bodies. FIG. 7 depicts a pot 20 comprising a pot wall 22, an attachment base 25 permanently attached to the pot wall 22, and a pot attachment part 26 permanently attached to the attachment base 25. The pot attachment part 26 comprises same density polka dot protruding engagement components 30 forming a sphere. The pot attachment part 26 is attached to the attachment base 25 rather than the pot wall 22 directly in order to reduce obstruction of the engagement components 30. FIG. 8 depicts a handle 10 comprising two connected handle bodies 12, the handle automatic locking mechanism 15 described in FIGS. 1 and 1A, and the compression spring 50. Each handle body 12 comprises a gripping part 14, an attachment part 16, and a rotation part 18. As best seen in FIG. 11, the handle bodies 12 are connected by a pivot 56 inserted into aligned holes 64 of the rotation parts 18. Each of the handle attachment parts 16 comprises same density polka dot receiving engagement components 31 forming a spherical segment. In order to attach the handle 10 to the pot attachment part 26, the user must position the handle attachment parts 16 around the pot attachment part 26 in a desired position and squeeze the gripping parts 14 compressing the spring 50 until the pot engagement components 30 and the handle engagement components 31 get engaged. At this point the automatic lock will fixate handle 10 on pot 20 in the chosen position. Spherical orientation of pot engagement components 30 works in tandem with the complementary orientation of handle engagement components 31 and handle locking mechanism described in FIGS. 1 and 1A for securing any position of handle 10 attached to pot 20 and for maintaining any of the attached positions secured without user assistance and regardless of orientation of the cooking apparatus. For exemplary purposes, FIGS. 9 and 10 demonstrate two different attached positions. In order to remove the handle 10 from the pot 20, the user must disengage the lock which will result in the automatic detachment of the handle 10 by spring 50.

Figures 58, 59:
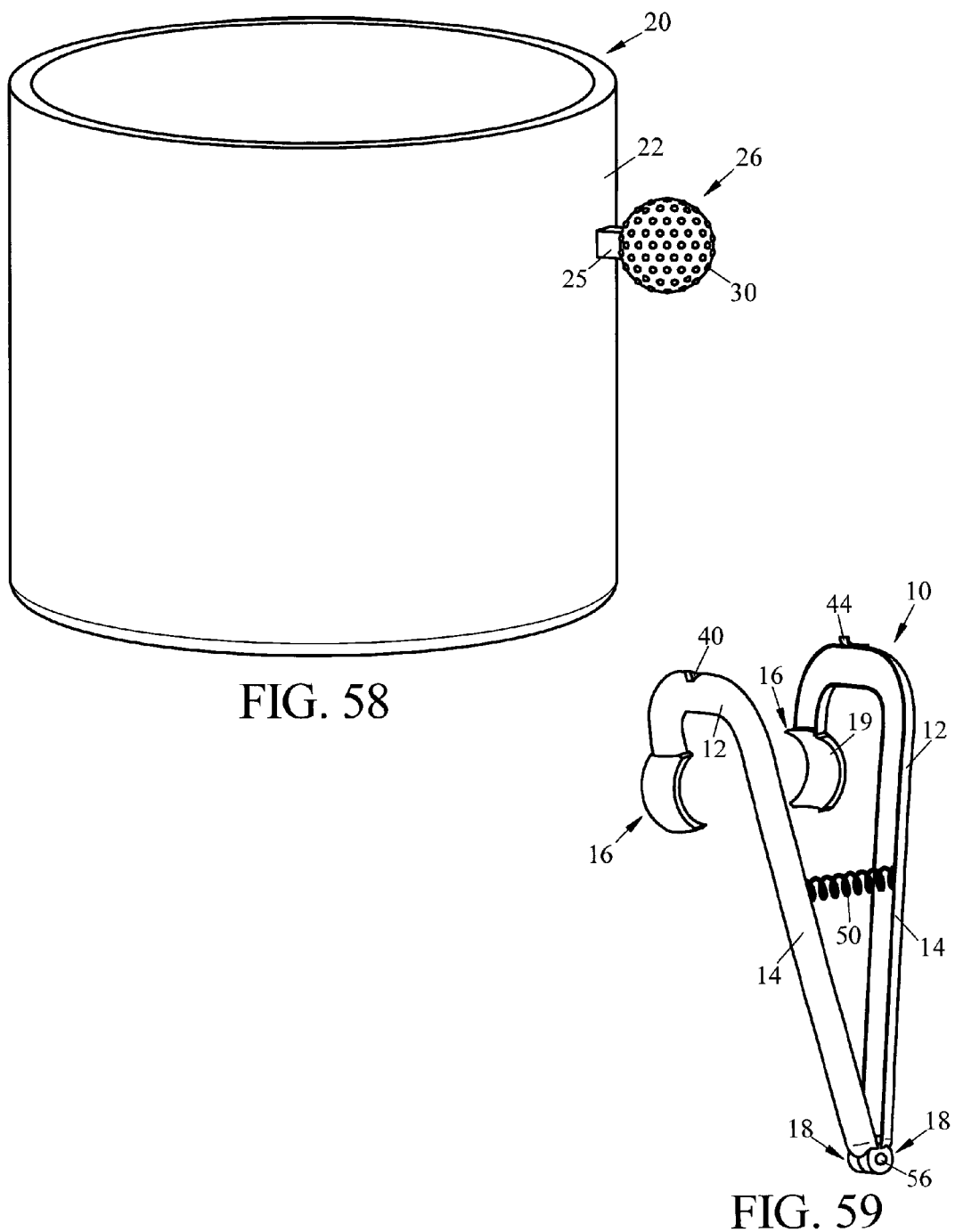
FIG. 58 shows a perspective view of a pot with a pot attachment part comprising spherical polka dot protruding engagement components forming a sphere.
FIG. 59 shows a perspective view of a detachable handle comprising two handle bodies with attachment parts comprising elastic engagement components adapted to engage with the spherical polka dot protruding engagement components of the pot attachment part shown in FIG. 58.
Figure 60:
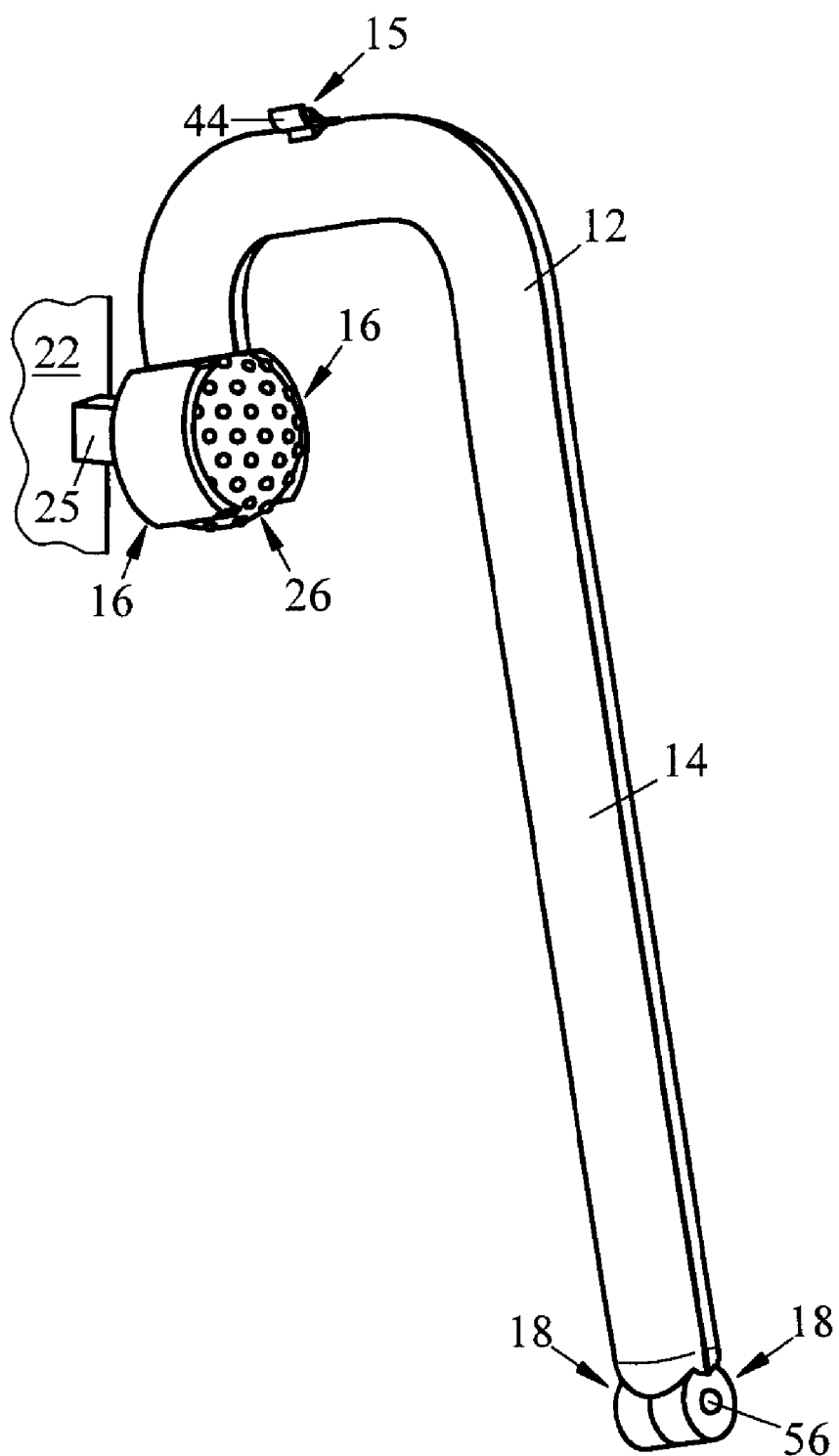
FIG. 60 shows a partial perspective view of an attached position of the handle and the pot shown in FIGS. 58 and 59.

FIGS. 58-60 depict a sample cooking apparatus demonstrating fixed polka dot spherical engagement components and elastic engagement components used for a pot with handles comprising two handle bodies. FIG. 58 depicts a pot 20 comprising a pot wall 22, an attachment base 25 permanently attached to the pot wall 22, and a pot attachment part 26 permanently attached to the attachment base 25. The pot attachment part 26 comprises same density polka dot protruding engagement components 30 forming a sphere. The pot attachment part 26 is attached to the attachment base 25 rather than the pot wall 22 directly in order to reduce obstruction of the engagement components 30. FIG. 59 depicts a handle 10 comprising two connected handle bodies 12, the handle automatic locking mechanism 15 described in FIGS. 1 and 1A, and the compression spring 50. Each handle body 12 comprises a gripping part 14, an attachment part 16, and a rotation part 18. Each of the handle attachment parts 16 comprises an elastic engagement component 19 forming a spherical segment. In order to attach the handle 10 to the pot attachment part 26, the user must position the handle attachment parts 16 around the pot attachment part 26 in a desired position and squeeze the gripping parts 14 compressing the spring 50 until the pot engagement components 30 and the handle elastic engagement components 19 get engaged. At this point the automatic lock will fixate handle 10 on pot 20 in the chosen position. Spherical orientation of pot engagement components 30 works in tandem with the complementary shapes of handle elastic engagement components 19 and handle locking mechanism described in FIGS. 1 and 1A for securing any position of handle 10 attached to pot 20 and for maintaining any of the attached positions secured without user assistance and regardless of orientation of the cooking apparatus. FIG. 60 demonstrates the handle 10 attached to the pot 20. In order to remove the handle 10 from the pot 20, the user must disengage the lock which will result in the automatic detachment of the handle 10 by spring 50.

Figure 12:
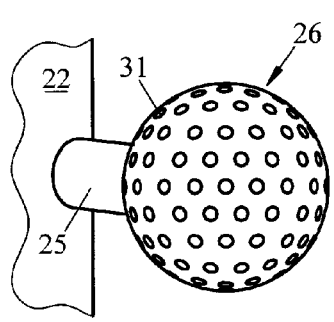
FIG. 12 shows a partial perspective view of a pot with a pot attachment part comprising spherical polka dot receiving engagement components forming a sphere.
Figure 13:
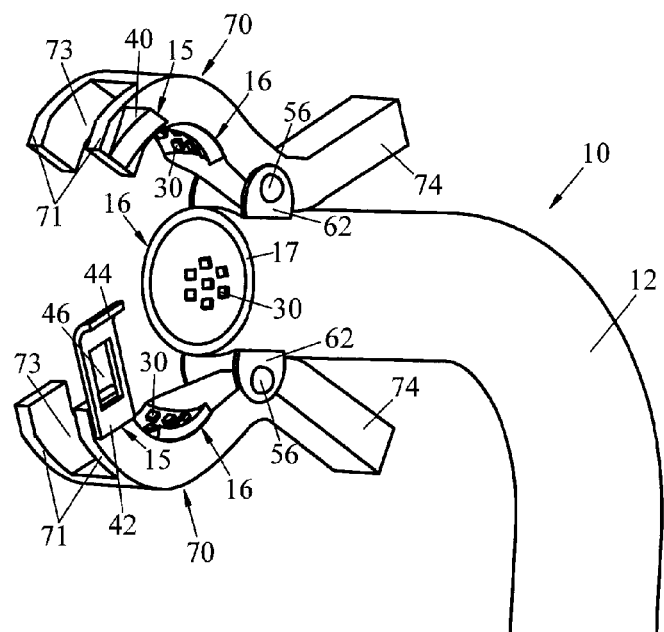
FIG. 13 shows a perspective view of a detachable handle comprising one handle body with two arms shown in an unlocked position and three attachment parts comprising spherical polka dot protruding engagement components adapted to engage with the spherical polka dot receiving engagement components of the pot attachment part shown in FIG. 12.
Figure 14:
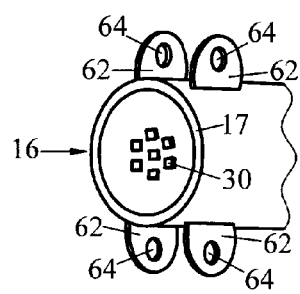
FIG. 14 shows a partial perspective view of the handle shown in FIG. 13 without the arms.
Figure 15:
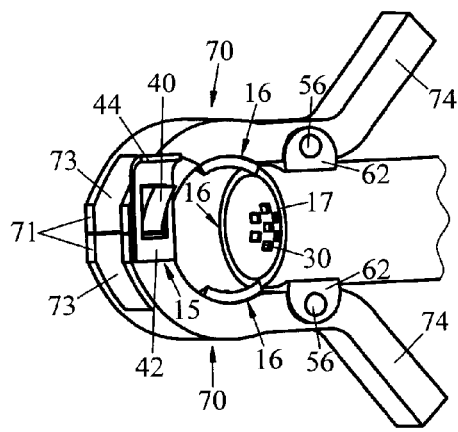
FIG. 15 shows a partial perspective view of the handle shown in FIG. 13 with the arms shown in the locked position.
Figure 16:
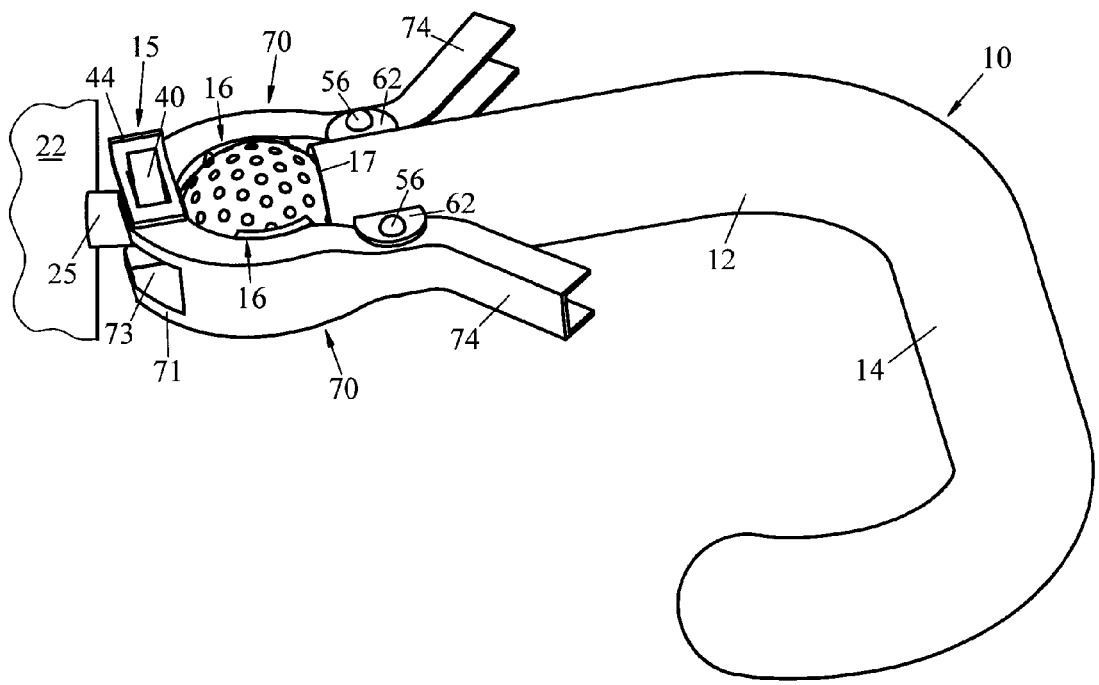
FIG. 16 shows a partial perspective view of an attached position of the handle and the pot shown in FIGS. 12 and 13.
Figure 17:
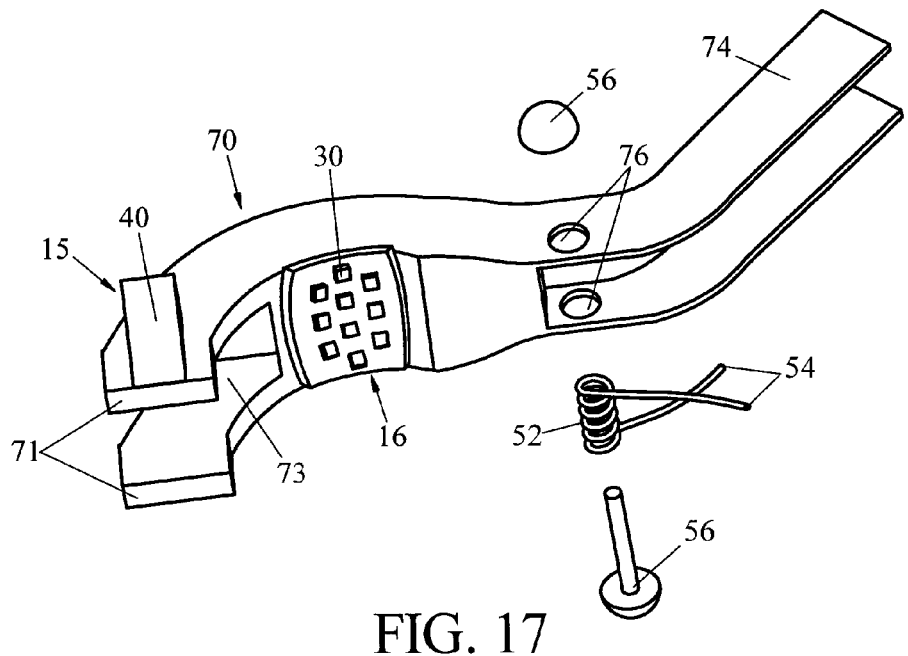
FIG. 17 shows an exploded perspective view of one of the arms shown in FIGS. 13, 15, and 16.

FIGS. 12-17 depict a sample cooking apparatus demonstrating polka dot spherical engagement components used for a pot with handles comprising one handle body. FIG. 12 depicts a pot attachment part 26 comprising same density polka dot receiving engagement components 31 forming a sphere. The pot attachment part 26 is permanently attached to an attachment base 25 which is permanently attached to the pot wall 22. The FIG. 13 depicts a handle 10 comprising one handle body 12. The handle body 12 comprises a gripping part 14, two pairs of protruded mounts 62 with holes 64 (seen in FIG. 14), two arms 70, a central attachment part 16 located at an end 17 of the handle body 12, and two more arm attachment parts 16 located on the arms 70. All of the attachment parts 16 comprise same density polka dot protruding engagement components 30 forming spherical segments. Each arm 70 (FIG. 17) comprises an engaging member 71 with an open space 73 at one end, a pressing tab 74 at the other end, and two opposing holes 76 between the engaging member 71 and the pressing tab 74. For demonstrative purposes, the pot engagement components 31 are circular in shape and the handle engagement components 30 are square shaped. The handle automatic locking mechanism 15 described in FIGS. 1 and 1A is located on the arms 70. The arms 70 are attached to the protruded mounts 62 by aligning holes 76 and 64 in such way that the engaging members 71 face each other, then a torsion spring 52 is positioned between the arm holes 76 and a pivot 56 connects the torsion spring 52 and the arms 70 to the protruded mounts 62. The torsion spring 52 includes two arms 54 at the ends with one torsion spring arm 54 extending to the inner surface of the arm 70 and the other torsion spring arm 54 extending to the outer surface of the handle body 12 keeping the engaging members 71 locked in front of the handle central attachment part 16 (FIG. 15). FIG. 16 demonstrates the handle 10 in an attached position. In order to attach the handle 10 to the pot attachment part 26, the user must first disengage the lock and squeeze the pressing tabs 74 compressing the torsion spring 52 which will result in the arms 70 being brought apart. Then, the user positions the attachment parts 16 around the pot attachment part 26 in a desired position by utilizing the open space 73, engages the central handle attachment part 16 with the pot attachment part 26 and releases the pressing tabs 74 allowing deflecting force of the springs 52 to bring the engaging members 71 toward the pot attachment part 26 causing the arm attachment parts 16 to engage with the pot attachment part 26 at which point the automatic lock will fixate handle 10 on pot 20 in the chosen position. Spherical orientation of pot engagement components 31 works in tandem with the complementary orientation of handle engagement components 30 and handle locking mechanism described in FIGS. 1 and 1A for securing any position of handle 10 attached to pot 20 and for maintaining any of the attached positions secured without user assistance and regardless of orientation of the cooking apparatus. In order to remove the handle 10 from the pot 20, the user must disengage the lock, squeeze the pressing tabs 74 which will result in the engaging members 71 to come apart and the arm attachment parts 16 to be disengaged from the pot attachment part 26 thus allowing detachment of the handle 10 from the pot 20 when finally disengaging the handle central attachment part 16 from the pot attachment part 26.

Figures 20, 20A:
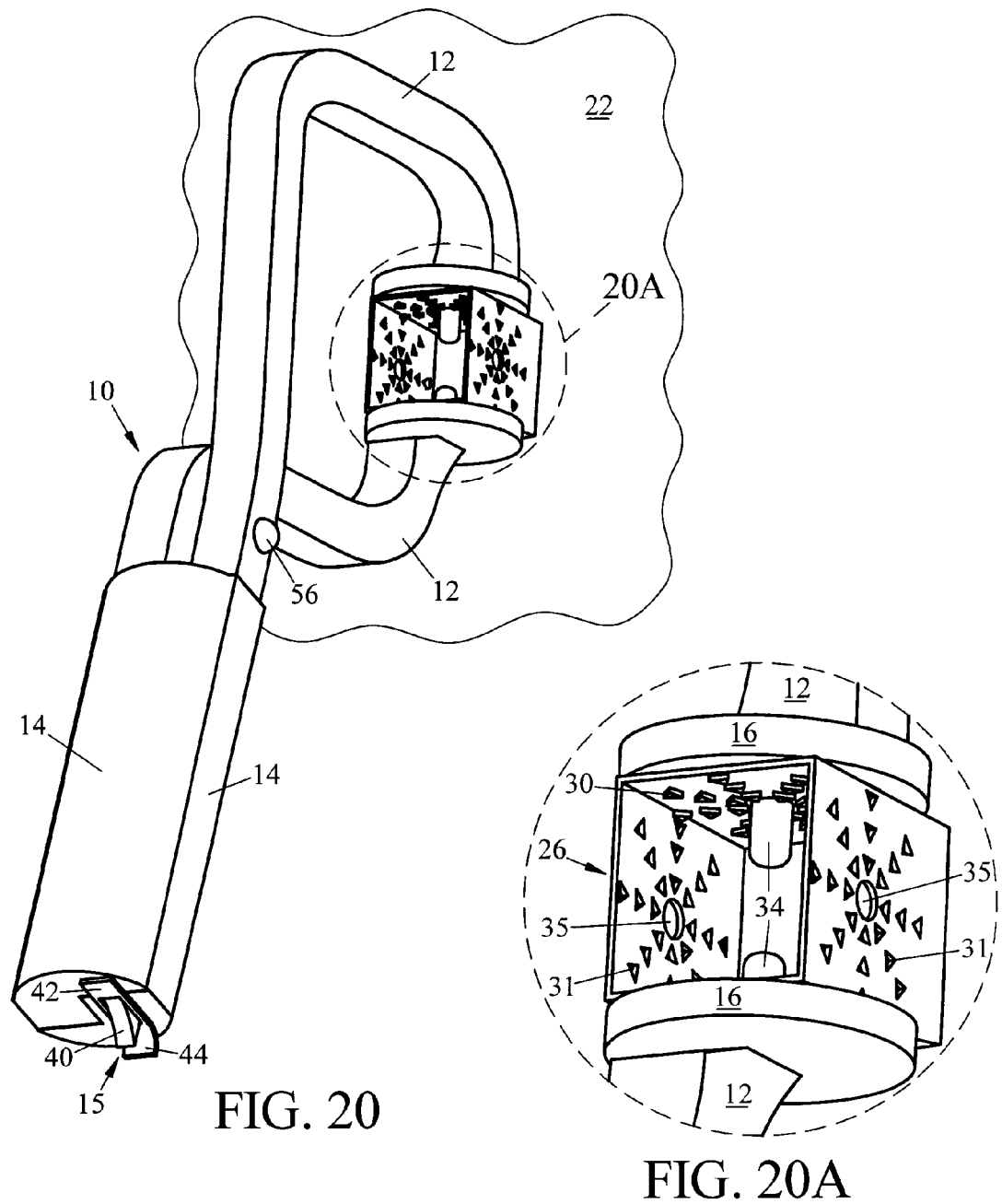
FIG. 20 shows a partial perspective view of an attached position of the handle and the pot shown in FIGS. 18 and 19.
FIG. 20A shows an enlarged view of the pot and handle attachment parts in the attached position shown in FIG. 20.

FIGS. 18-20A depict a sample cooking apparatus demonstrating polka dot non-spherical engagement components with a pot attachment part 26 comprising two planes for the handle 10 orientation about the pot 20. FIG. 18 depicts a hollow pot attachment part 26 permanently attached to the pot wall 22 comprising four receiving center parts 35 and polka dot receiving engagement components 31. Two plane based pot attachment part 26 serves an exemplary purpose; hexagon based pot attachment part will provide three planes, octagon based pot attachment part will provide four planes, etc. FIG. 19 depicts a handle 10 comprising two connected handle bodies 12. Each handle body 12 comprises a gripping part 14 and an attachment part 16 (FIG. 19A). The handle bodies 12 are connected by a pivot 56. Each of the handle attachment parts 16 comprises a protruding center part 34 and polka dot protruding engagement components 30. The handle attachment parts 16 are pivotal about the pot receiving center parts 35 when the center parts 34 and 35 are engaged. For demonstrative purposes, both of the pot and handle engagement components 30 and 31 are triangular in shape. The handle automatic locking mechanism 15 described in FIGS. 1 and 1A is located at the bottom of the handle gripping parts 14. FIGS. 20 and 20A demonstrate the handle 10 attached to the pot 20. In order to attach the handle 10 to the pot attachment part 26, the user separates the handle gripping parts 14 manually bringing the handle attachment parts 16 apart, positions the handle attachment parts 16 above two opposing sides of the pot attachment part 26 in a desired position, and then brings the gripping parts 14 toward the pot attachment part 26 until the handle protruding center parts 34 engage with the pot receiving center parts 35. Once the center parts 34 and 35 are engaged, the user pivots the handle 10 about the pot center parts 35 to another position if necessary and continues to bring the gripping parts 14 together until the pot engagement components 31 and handle engagement components 30 get engaged at which point the automatic lock will fixate handle 10 on pot 20 in the chosen position. Pot receiving center parts 35 and pot engagement components 31 work in tandem with handle protruding center parts 34, handle engagement components 30, and handle locking mechanism described in FIGS. 1 and 1A for securing any position of handle 10 attached to pot 20 and for maintaining any of the attached positions secured without user assistance and regardless of orientation of the cooking apparatus. In order to detach the handle 10 from the pot 20, the user must disengage the lock and manually separate the handle gripping parts 14 causing the handle engagement components 30 to disengage from the pot engagement components 31 and the handle center parts 34 to disengage from the pot center parts 35.

Figure 21:
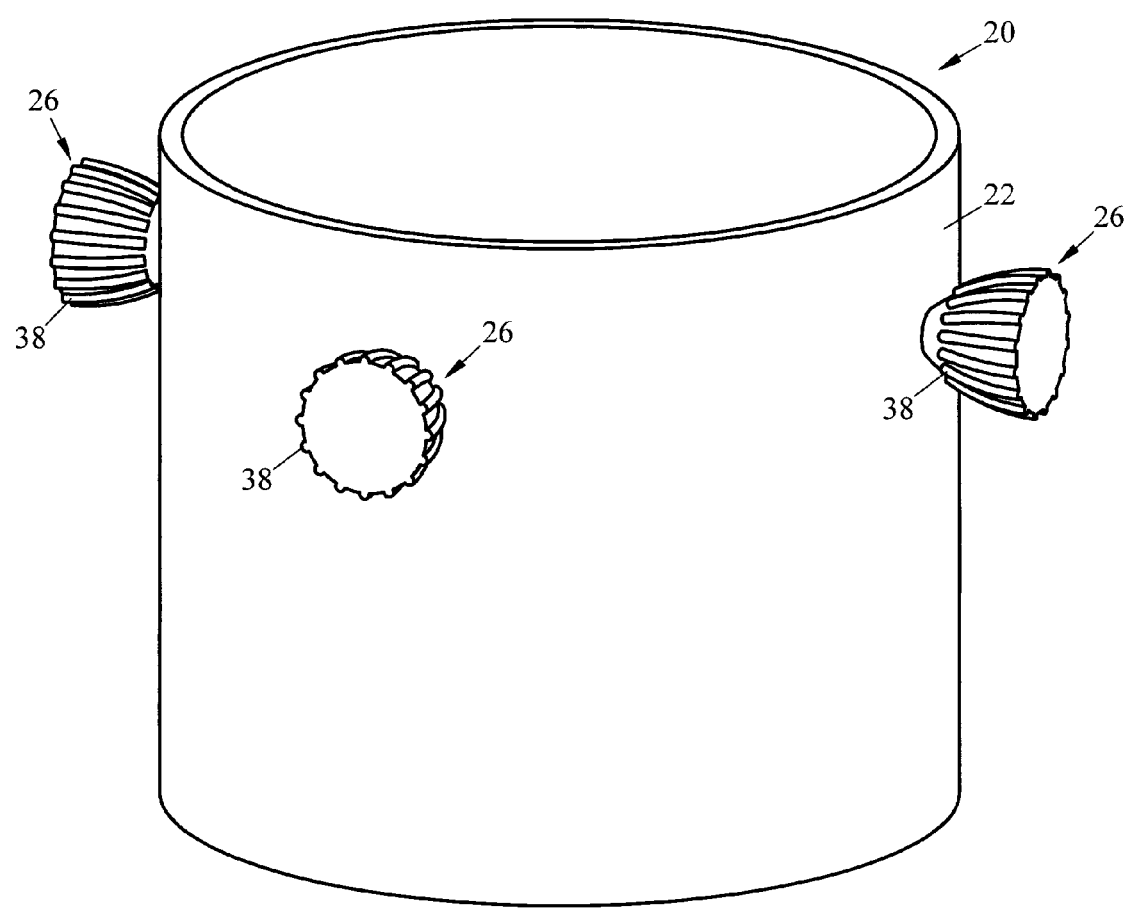
FIG. 21 shows a perspective view of a pot with three pot attachment parts comprising continuous protruding engagement components resembling curved lines.

FIGS. 21-23 depict a sample cooking apparatus demonstrating pot and handle continuous engagement components resembling curved lines. FIG. 21 depicts a pot 20 comprising three pot attachment parts 26 permanently attached to the pot wall 22. Each of the pot attachment parts 26 comprises continuous protruding engagement components 38 curved inwardly toward the pot wall 22. FIG. 22 depicts a handle 10 comprising two connected handle bodies 12. Each handle body 12 comprises a gripping part 14 and an attachment part 16. The handle bodies 12 are connected by a pivot 56. Each of the handle attachment parts 16 comprises continuous receiving engagement components 39 curved outwardly toward the handle gripping parts 14. The handle automatic locking mechanism 15 described in FIGS. 1 and 1A is located at the bottom of the handle gripping parts 14 and a spring 50 is located between the handle gripping parts 14. In order to achieve an attached position illustrated in FIG. 23, the user must position the handle attachment parts 16 around the pot attachment part 26 in a desired position and squeeze the gripping parts 14 compressing the spring 50 until the pot engagement components 38 and handle engagement components 39 get engaged at which point the automatic lock will fixate the handle 10 on the pot 20 in the chosen position. Orientation of pot engagement components 38 works in tandem with the complementary orientation of handle engagement components 39 and handle locking mechanism described in FIGS. 1 and 1A for securing any position of handle 10 attached to pot 20 and for maintaining any of the attached positions secured without user assistance and regardless of orientation of the cooking apparatus. In order to remove the handle 10 from the pot 20, the user must disengage the lock which will result in the automatic detachment of the handle 10 by decompression force of the spring 50.

For exemplary purposes, a sample of blocking parts for a handle comprising one handle body with continuous engagement components is depicted in FIGS. 24-31. FIG. 24 depicts a pot attachment part 26 comprising receiving engagement components 39 and a solid area 100 with no engagement components. FIG. 25 depicts a handle attachment part 16 comprising protruding engagement components 38 and a solid area 102 with no engagement components. The handle 10 is prevented from being attached to the pot 20 when the handle 10 is oriented about the pot 20 in such way that the solid area 100 is not positioned against the solid area 102. When positioning the handle attachment part 16 about the pot attachment part 26 in a desired attached position, the handle attachment part 16 can be positioned from a most left position (FIGS. 26 and 27) to a most right position (FIGS. 28 and 29) or any position between, for instance, a center position (FIGS. 30 and 31).

For exemplary purposes, a sample of blocking parts for a handle comprising two handle bodies with polka dot engagement components is depicted in FIGS. 32-39. FIG. 32 depicts a pot attachment part 26 comprising receiving engagement components 31 and a solid area 100 with no engagement components. FIG. 33 depicts a handle attachment part 16 comprising protruding engagement components 30 and a solid area 102 with no engagement components. The handle 10 is prevented from being attached to the pot 20 when the handle 10 is oriented about the pot 20 in such way that the solid area 100 is not positioned against the solid area 102. When positioning the handle attachment part 16 about the pot attachment part 26 in a desired attached position, the handle attachment part 16 can be positioned from a most left position (FIGS. 34 and 35) to a most right position (FIGS. 36 and 37) or any position between, for instance, a center position (FIGS. 38 and 39).

Figure 40:
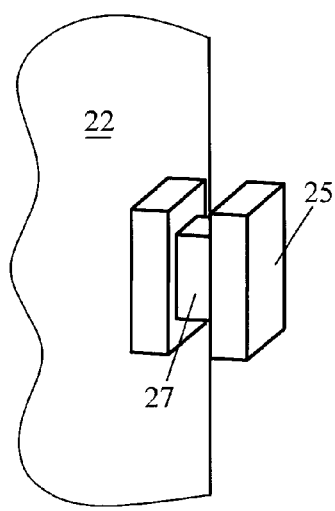
FIG. 40 shows a partial perspective view of an attachment base permanently attached to a pot.
Figure 45:
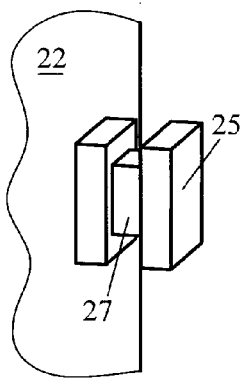
FIG. 45 shows a partial perspective view of an attachment base permanently attached to a pot.

In order to save space while storing the cooking apparatuses and for better access while cleaning, a pot attachment part can be made detachable. This can be done via a small attachment base 25 permanently attached to a pot wall 22 as shown in FIGS. 40 and 45. The attachment base 25 includes a receiving channel 27 which goes around the attachment base 25. A detachable pot attachment part must be adapted to be positioned on the attachment base 25. In addition, the detachable pot attachment part must include a locking mechanism adapted to engage with the receiving channel 27 in order to fixate the detachable pot attachment part on the attachment base 25. The attachment base shape is chosen in such way that it prevents the pot attachment part from rotating around the attachment base 25 when locked. Although the attachment base 25 is depicted as rectangular in shape, other shapes such as hexagonal, for instance, can be used, if desired. For demonstrative purposes, FIGS. 41-44 depict a sample detachable pot attachment part 26 made of two sphere halves previously seen in FIG. 7 as a permanently attached sphere and FIGS. 46-51 depict another sample detachable pot attachment part 26 previously seen in FIG. 21 as permanently attached.

Figure 41:
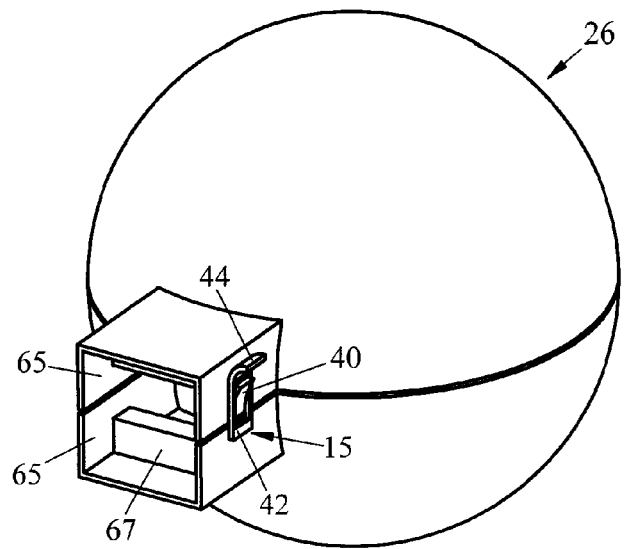
FIG. 41 shows a perspective view of a detachable pot attachment part comprising two half-spheres in a locked position (engagement components are not shown)
Figure 42:
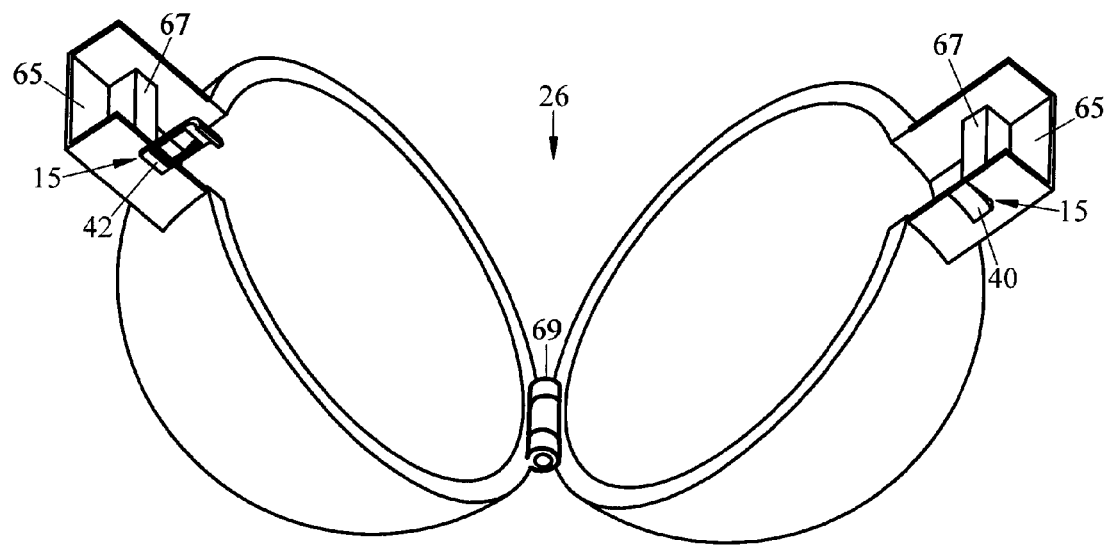
FIG. 42 shows a perspective view of a detachable pot attachment part comprising two half-spheres not locked (engagement components are not shown)
Figure 43:
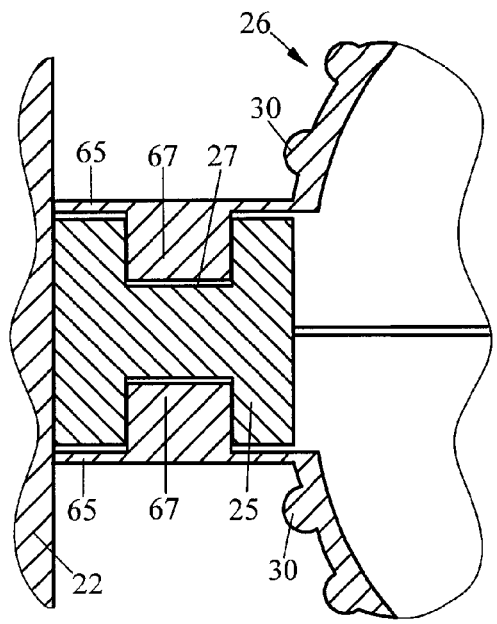
FIG. 43 shows a partial sectional view of the detachable pot attachment part shown in FIGS. 41 and 42 attached to the attachment base shown in FIG. 40.
Figure 44:
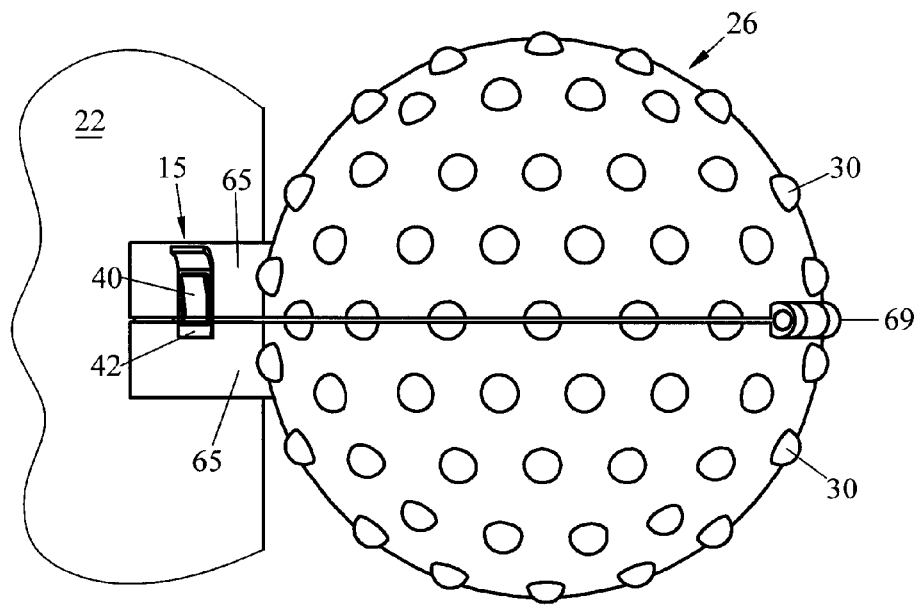
FIG. 44 shows a partial perspective view of the detachable pot attachment part shown in FIGS. 41 and 42 (the engagement components are shown) attached to the attachment base shown in FIG. 40.

FIGS. 41 and 42 depict the pot attachment part 26 comprising two sphere halves (engagement components are not shown to avoid cluttering the figure) with each sphere half permanently attached to a half cap 65. The two sphere halves are connected by a hinge 69 enabling the two sphere halves to be brought together in order to form a whole sphere (FIG. 41). Each half cap 65 includes a protruding section 67 adapted to engage with the receiving channel 27 when being positioned over the attachment base 25. The two half caps 65 are adapted to automatically lock to each other when the two sphere halves are brought together. The automatic locking mechanism 15 described in FIGS. 1 and 1A is located on the half caps 65. In order to attach the detachable pot attachment part 26 to the attachment base 25 (FIGS. 43 and 44), two sphere halves are brought together causing the protruding section 67 of each half cap 65 to engage with the receiving channel 27 of the attachment base 25 and automatically lock to each other. The pot attachment part 26 is detached by unlocking and detaching the half caps 65 from the attachment base 25.

Figure 46:
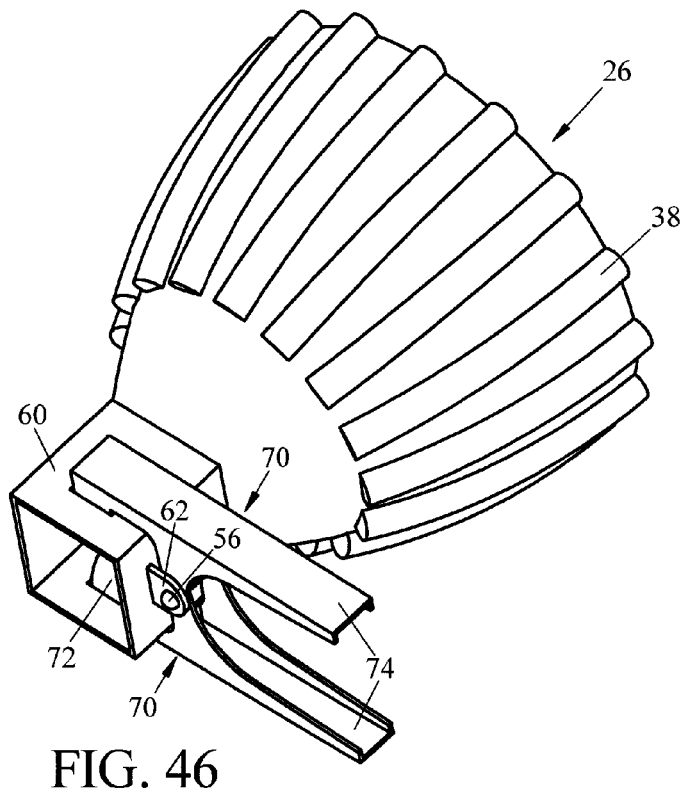
FIG. 46 shows a perspective view of a detachable pot attachment part comprising continuous engagement components for attaching to the attachment base shown in FIG. 45.
Figure 47:
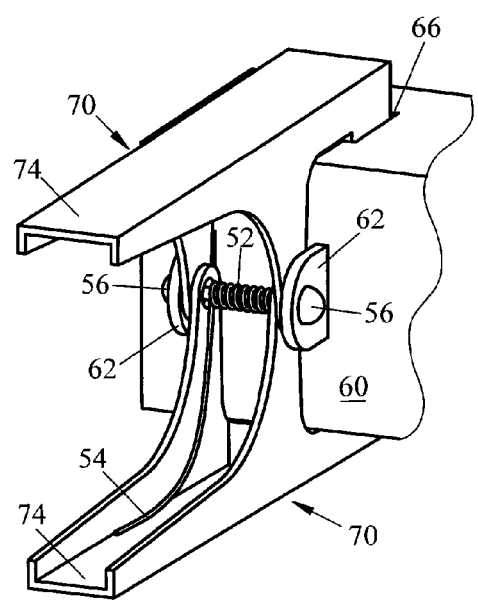
FIG. 47 shows a partial perspective view of the locking mechanism used in the pot attachment part depicted in FIG. 46.
Figure 48:
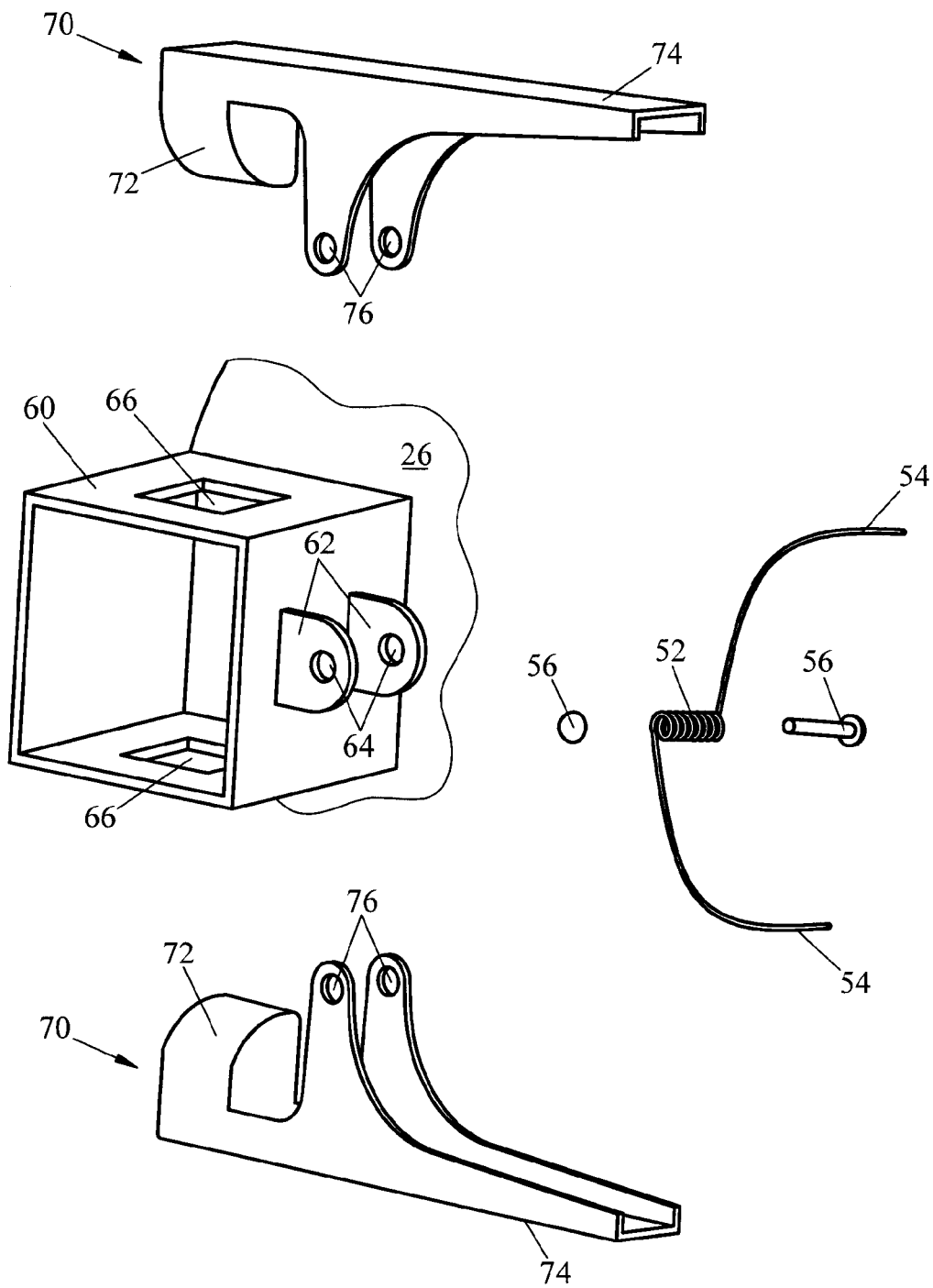
FIG. 48 shows a partial exploded perspective view of the locking mechanism used in the pot attachment part depicted in FIG. 46.
Figure 49:
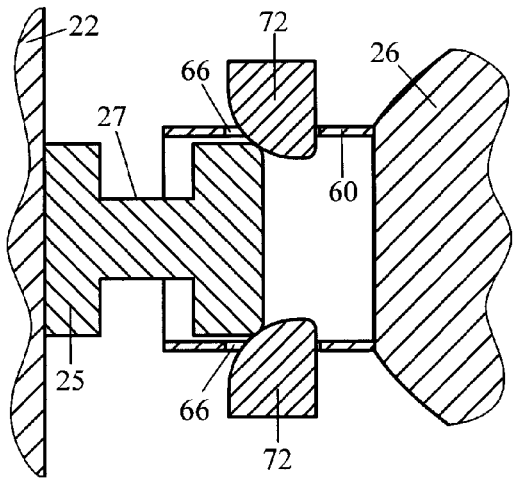
FIG. 49 shows a partial sectional view of the detachable pot attachment part shown in FIG. 46 beginning to engage with the attachment base shown in FIG. 45.
Figure 50:
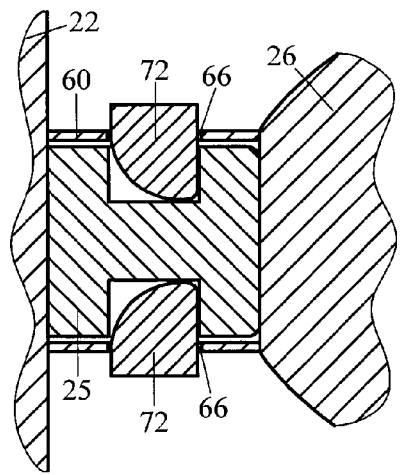
FIG. 50 shows a partial sectional view of the detachable pot attachment part shown in FIG. 46 attached to the attachment base shown in FIG. 45.
Figure 51:
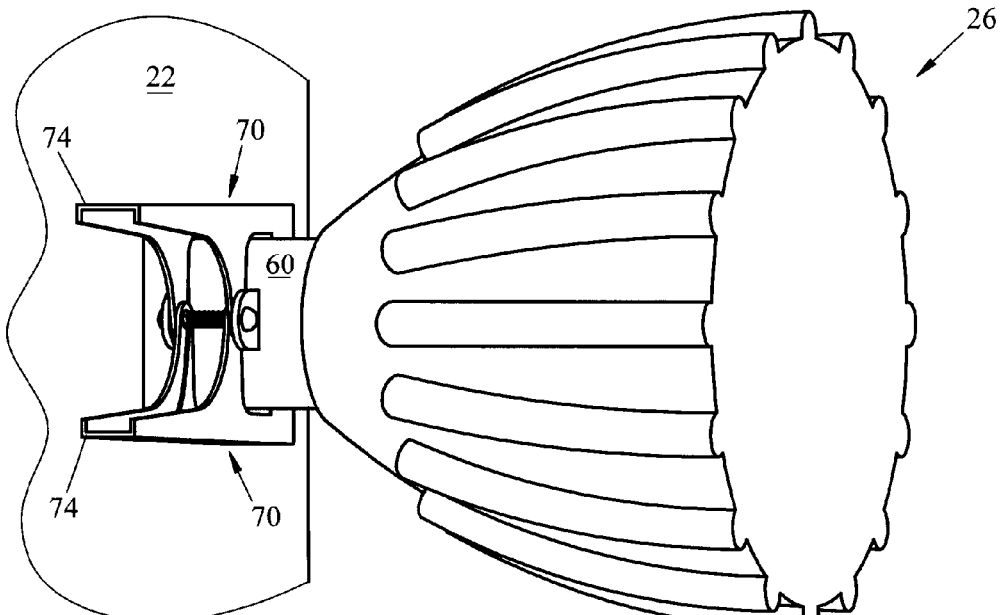
FIG. 51 shows a partial perspective view of the detachable pot attachment part shown in FIG. 46 attached to the attachment base shown in FIG. 45.

FIG. 46 depicts the pot attachment part 26 comprising continuous protruding engagement components 38, a cap 60 adapted to be positioned over the attachment base 25, and two arms 70. The cap 60 (FIG. 48) comprises a pair of protruded mounts 62 with holes 64 and two opposing cutouts 66. Each arm 70 has a pointed locking member 72 at one end, a pressing tab 74 at the other end, and two opposing holes 76 between the pointed locking member 72 and the pressing tab 74. The arms 70 are attached to the protruded mounts 62 by aligning holes 76 and 64 in such way that the pointed locking members 72 face each other, then a torsion spring 52 is positioned between the arm holes 76 and a pivot 56 connects the torsion spring 52 and the arms 70 to the protruded mounts 62. The torsion spring 52 includes two arms 54 at the ends which extend to the inner walls of the arms 70 keeping the pointed locking members 72 inside of the cutouts 66 (FIGS. 46 and 47). In order to attach the detachable pot attachment part 26 to the attachment base 25 (FIGS. 50 and 51), the cap 60 must slide over the attachment base 25. As the curved portions of the pointed locking members 72 encounter the edge of the attachment base 25 (FIG. 49), the pointed locking members 72 get tilted away from the attachment base 25 compressing the torsion spring 52 and remain in the tilted position as the cap 60 continues to slide over the attachment base 25. When the cutouts 66 reach the receiving channel 27, the pointed locking members 72 get inserted into the receiving channels 27 by decompression force of the torsion spring 52 securing the pot attachment part 26 to the attachment base 25. The pot attachment part 26 is manually removed from the attachment base 25 by squeezing the pressing tabs 74 of the arms 70 which will result in the pointed locking members 72 to be removed from the receiving channel 27 allowing detachment of the pot attachment part 26 from the attachment base 25.

Those who are skilled in the art will readily perceive how to modify the invention. Therefore, the appended claims are to be construed to cover all equivalent structures which fall within the scope and spirit of the invention.

What is claimed is:

1. A handling apparatus, comprising a man-made object to be handled repeatedly by a user and at least one detachable handle, said object comprises a rigid object body and at least one attachment member comprising a member engagement region and a member locking means, each of said at least one attachment member is rigidly attached in a predetermined way to a side surface of said object body, said detachable handle comprises a handle engagement region, a handle locking means, and a gripping means adapted for gripping by a hand, positioned said handle engagement region is capable of engaging with any area of said member engagement region it is aligned with, the configuration of said handle engagement region is predetermined to enclose at least partially said attachment member when engaged with any area of said member engagement region, a position of said handle is secured about said object when said handle engagement region is engaged with said member engagement region and said handle locking means is engaged with said member locking means, the configuration of said handle engagement region is predetermined for providing said handle with an ability to be oriented about each predetermined point of said attachment member in a plurality of positions where any point of said handle is equidistantly located from said each predetermined point in any of said plurality of positions, said gripping means is further adapted to allow said hand to be oriented at different vertical and horizontal angles about said side surface in said plurality of positions, whereby a user is able to orient said handle about said object conveniently according to a task at hand, said gripping means is furthermore adapted for a user to align and to engage said handle engagement region with any unobstructed area of said member engagement region in any of said plurality of positions, said handle locking means is adapted to engage automatically with said member locking means at the moment of engagement of said handle engagement region with any area of said member engagement region, said handle locking means and said member locking means, once engaged, are adapted to remain engaged without user assistance regardless of orientation of said object, said handle locking means is adapted to be disengaged from said member locking means manually by a user, said gripping means is additionally adapted for a user to disengage said handle engagement region from said member engagement region when said handle locking means is disengaged from said member locking means, said gripping means is also adapted for a user to detach said handle from said object when said handle engagement region is disengaged from said member engagement region.

2. The handling apparatus of claim 1 further comprising an automatic disengaging means capable of disengaging said handle engagement region from said member engagement region automatically at the moment of disengagement of said handle locking means from said member locking means when movement of said gripping means is unrestricted by a user.

3. The handling apparatus of claim 1, wherein said object body comprises at least one base comprising a base attachment means and wherein said attachment member further comprises a member attachment means, said attachment member is adapted for a user to engage said member attachment means with said base attachment means and to disengage said member attachment means from said base attachment means manually, said member attachment means and said base attachment means, once engaged, are further adapted to remain engaged for securing said attachment member to said base without user assistance at any orientation of said object, said attachment member is also adapted for a user to detach it from said base by disengaging said member attachment means from said base attachment means, said base is more compact than said attachment member, whereby a user is able to detach said attachment member for storing said object compactly.

4. The handling apparatus of claim 1 further comprising a blocking means preventing said handle engagement region from being aligned with predetermined areas of said member engagement region, whereby a user is incapable of attaching said handle to said object in disadvantageous positions.

5. The handling apparatus of claim 1, wherein said member engagement region comprises a plurality of member engagement components of a predetermined configuration and said handle engagement region comprises at least one handle engagement component configured complementary to said predetermined configuration, a position of said handle is secured about said object when each of said at least one handle engagement component is engaged with the aligned member engagement component and when said handle locking means is engaged with said member locking means.

6. The handling apparatus of claim 1, wherein said member engagement region is spherical, whereby a user is not restricted to two-dimensional orientation of said handle about said object in said plurality of positions.

* * * * *

UNITED STATES PATENT AND TRADEMARK OFFICE
CERTIFICATE OF CORRECTION

PATENT NO. : 7,793,389 B1  
APPLICATION NO. : 11/824902  
DATED : September 14, 2010  
INVENTOR(S) : Alisa Michnik and Yefim Michnik Page 1 of 1

It is certified that error appears in the above-identified patent and that said Letters Patent is hereby corrected as shown below:

Column 12, line 48, delete the word "positioned"

Signed and Sealed this
Tenth Day of May, 2011

David J. Kappos
*Director of the United States Patent and Trademark Office*